US010416616B2

(12) United States Patent
Ogden

(10) Patent No.: US 10,416,616 B2
(45) Date of Patent: *Sep. 17, 2019

(54) SEISMIC EVENT RESPONSIVE ALERT AND UTILITIES CONTROL SYSTEM AND METHODOLOGY

(71) Applicant: E-Seismic Solutions, LLC, Ponte Vedra Beach, FL (US)

(72) Inventor: Everett Ogden, Ponte Vedra Beach, FL (US)

(73) Assignee: E-SEISMIC SOLUTIONS, LLC, Ponte Vedra Beach, FL (US)

(*) Notice: Subject to any disclaimer, the term of this patent is extended or adjusted under 35 U.S.C. 154(b) by 43 days.

This patent is subject to a terminal disclaimer.

(21) Appl. No.: 15/898,905

(22) Filed: Feb. 19, 2018

(65) Prior Publication Data

US 2018/0329373 A1    Nov. 15, 2018

Related U.S. Application Data

(62) Division of application No. 15/893,984, filed on Feb. 12, 2018.

(Continued)

(51) Int. Cl.
*G05B 13/02* (2006.01)
*G08B 21/10* (2006.01)
*G06Q 50/06* (2012.01)
*G05B 19/042* (2006.01)
*G05B 23/02* (2006.01)
*G08B 27/00* (2006.01)

(52) U.S. Cl.
CPC ......... *G05B 13/026* (2013.01); *G05B 19/042* (2013.01); *G05B 23/0272* (2013.01); *G06Q 50/06* (2013.01); *G08B 21/10* (2013.01); *G08B 27/005* (2013.01); *G08B 27/006* (2013.01); *G08B 27/008* (2013.01); *G05B 2219/2639* (2013.01)

(58) Field of Classification Search
None
See application file for complete search history.

(56) References Cited

U.S. PATENT DOCUMENTS 4,841,287 A * 6/1989 Flig .................. F16K 17/36
137/39
5,920,828 A * 7/1999 Norris ................ G01V 1/003
702/14

(Continued)

*Primary Examiner* — Ramesh B Patel
(74) *Attorney, Agent, or Firm* — Thomas C. Saitta

(57) ABSTRACT

A method adapted to provide alert signals to individuals or institutions and/or control signals to utilities control units to automatically stop the flow of gas, water, electricity, oil, etc., such signals being delivered in response to the detection of seismic events, the detection occurring via ground-based monitoring systems and/or satellite-based monitoring systems. The alert and/or control signals are distributed through various broadcasting systems or similar channels of communication, such as radio frequency transmitters, Internet service providers, cell phone wireless carriers, satellite phone service providers and/or security monitoring service providers, to individuals and/or facilities through smartphones, landline telephones, tablets, PC's, voice-controlled web communication devices or the like and/or to signal receivers on utilities control units.

17 Claims, 2 Drawing Sheets

Related U.S. Application Data

(60) Provisional application No. 62/504,961, filed on May 11, 2017, provisional application No. 62/569,925, filed on Oct. 9, 2017.

(56) References Cited

U.S. PATENT DOCUMENTS

| | | | |
|---|---|---|---|
| 6,329,538 B1 | 12/2001 | Batcho et al. | |
| 6,414,601 B1 * | 7/2002 | Massedonio | G08B 21/10 340/690 |
| 7,813,224 B2 * | 10/2010 | Krumhansl | G01V 1/147 181/121 |
| 8,824,996 B2 * | 9/2014 | Andersen | H04W 8/245 455/404.1 |
| 9,182,052 B2 * | 11/2015 | Scott | F16K 31/046 |
| 9,251,687 B2 * | 2/2016 | Thompson | G08B 21/10 |
| 9,261,204 B2 | 2/2016 | Scott et al. | |
| 9,601,947 B2 * | 3/2017 | Ogden | F17D 5/00 |
| 2003/0052777 A1 | 3/2003 | Bleier | |
| 2004/0134533 A1 * | 7/2004 | Cowan | E03B 1/00 137/209 |
| 2010/0148940 A1 * | 6/2010 | Gelvin | G06F 15/173 340/286.02 |
| 2012/0274440 A1 * | 11/2012 | Meadows | G01V 1/008 340/3.42 |
| 2017/0070090 A1 * | 3/2017 | Miller | H02J 13/0079 |
| 2018/0329092 A1 * | 11/2018 | Ogden | G01V 1/008 |
| 2018/0329377 A1 * | 11/2018 | Ogden | G05B 15/02 |
| 2018/0329380 A1 * | 11/2018 | Ogden | G05B 13/026 |

\* cited by examiner

SEISMIC EVENT RESPONSIVE ALERT AND UTILITIES CONTROL SYSTEM AND METHODOLOGY

This application claims the benefit of U.S. Provisional Patent Application Ser. No. 62/504,961, filed May 11, 2017, and titled Seismic Responsive Utilities Control System, and U.S. Provisional Patent Application Ser. No. 62/569,925, filed Oct. 9, 2017, and titled Seismic Responsive Municipalities Monitoring Water Gas Electronic Sensor and Valve, the disclosures of which are incorporated herein by reference. This application is a divisional application of U.S. application Ser. No. 15/893,984, filed Feb. 12, 2018.

BACKGROUND OF THE INVENTION

This application relates generally to the field of systems, devices and methods that provide alerts in response to seismic events and/or systems and devices that control utilities, such as water or gas pipelines, in response to seismic events.

Seismic events, i.e., earthquakes, vary in strength and damage depending on the magnitude of the seismic event, the distance from the event, the type of terrain, etc., such that the seismic event may result in little or no damage to life and infrastructure (buildings, roads, utilities, etc.) or may result in massive and widespread damage and loss of life. The damage may result from direct shock and tremor effects, such as building collapse, or from secondary dangers, such as gas explosions, fires or flooding. Rapid and widespread warnings upon the occurrence of a seismic event may reduce loss of life and secondary damage to infrastructure. The most common known seismic event monitoring systems rely upon physical sensor devices that react to tremors or shockwaves produced by an active seismic event. Such devices may be as simple as pedestal switches, mercury switches, tilt switches or the like that are affected by physical vibrations, or may be more complicated devices involving integrated circuits on electronic microchips, microprocessors or the like also affected by physical vibrations.

One way to mitigate secondary damage to structures is to cut off gas, water and/or electrical flow when a seismic event occurs. Manual control of utilities by homeowners and business owners is a possible way to address this, but it is unlikely that such actions will be undertaken upon the occurrence of a seismic event, given that personal safety will be the paramount motivating factor for any action and that the time from a warning alert to experiencing the damage from the seismic event may be only a matter of seconds. In view of this, California, the state most prone to seismic events, has promulgated regulations requiring homes and businesses to have automatic cutoff valves for gas pipelines that are responsive to seismic events. Similar devices are known for automatically cutting off the delivery of water and electricity as well. The devices are typically vibration sensitive such that they respond to physical effects, i.e., tremors or shock waves. It has proven difficult to design such devices which are able to distinguish between actual seismic events versus false positives caused by sonic booms, truck traffic, building construction, etc., meaning that the threshold sensitivity of the devices must be set artificially high to avoid the false positives.

Strong ground tremors from an earthquake travel at about 2 miles per second, so it is possible to detect a large earthquake near its source and broadcast a warning of imminent strong tremors to more distant areas before the tremors arrive. Systems known as Early Earthquake Warning (EEW) systems are known. Such EEW systems are operational in several countries around the world, including Mexico, Japan, Turkey, Romania, China, Italy, and Taiwan. The (USGS) operates such an earthquake monitoring and warning system which initiates the broadcast of Wireless Emergency Alerts (WEA) upon the occurrence of a seismic event.

Since 2006 the United States Geological Service (USGS) has been developing EEW and WEA systems for the United States, with the help of several cooperating organizations including the California Geological Survey (CGS), the California Institute of Technology (Caltech), the California Office of Emergency Services (CalOES), the Moore Foundation, the University of California, Berkeley, the University of Washington, and the University of Oregon. The goal is to provide an effective EEW system for the highest risk areas of the United States, beginning with the West Coast states: California, Washington, and Oregon.

These current systems can only detect and provide warning alerts and/or control utilities flow simultaneously or shortly after the occurrence of the seismic event. Recently a reliable system for monitoring and predicting seismic events has been developed whereby early, non-physical seismic signals detected by satellites are used to provide earlier notice of a seismic event. Rapid movement of the Earth's crust generates electromagnetic radiation which disrupts or alters electromagnetic fields, ionosphere plasma and high-energy particles. These effects, sometimes referred to as lithosphere-atmosphere-ionosphere (LAI) coupling effects, can be sensed prior to the time that the crust movement produces the actual surface level tremor or shock. Such satellite-based systems have been shown to detect the dangerous seismic event as much as several hours prior to its effective occurrence on the surface. By detecting these electromagnetic signals, warning alerts and/or utilities flow control signals can be initiated by a satellite-based system much sooner than with the known ground-based systems.

It is an object of this invention to provide a seismic alert and utilities control system and methodology that is both responsive to ground-based physical detection of seismic events as well as predictive, in the sense of satellite-based detection of electromagnetically-produced signals which occur prior to any physical effects being detectable by ground-based physical sensors. It is a further object to provide such a system and methodology that utilizes a combination of ground-based and satellite-based seismic event monitoring systems. It is a further object to provide such a system and methodology that optimizes delivery of warning alerts and/or utilities control signals, both in terms of controlled broadcast distribution to affected regions and in terms of providing multiple, redundant alert distribution systems. It is a further object to provide such a system and methodology that incorporates differing and/or redundant triggering and sensing systems for distribution of alerts and utilities control actuations. It is a further object to provide such a system and methodology that optimizes the ability of utilities providers and utilities users to return the utilities to operational status after the seismic event. It is a further object to provide such a system and methodology able to transmit data to utilities providers, facilities operators and other users indicating post-seismic-event status or condition. It is a further object to provide such a system having a dedicated software interface for smartphones, tablets or personal computers providing operational control and information to the user.

SUMMARY OF THE INVENTION

In a broad embodiment, the invention is a system and its related methodology adapted to provide alert signals to individuals or institutions and/or control signals to utilities control units to automatically stop the flow of gas, water, electricity, oil, etc., such signals being delivered in response to the detection of seismic events, the detection occurring via ground-based monitoring systems, which for example employ physically responsive sensors which detect tremors or shock waves, such as vibration sensors, as well as other sensors to detect geological, surface and near-surface effects produced by the seismic event which occur at or near the surface, in combination with satellite-based monitoring systems, which for example employ sensors which detect LAI effects created by the seismic events, such as for example electromagnetic radiation disruption or alteration of electromagnetic fields, ionosphere plasma and high-energy particles, which are detectable in the upper atmosphere. The alert and/or control signals are distributed through various broadcasting systems or similar channels of communication, such as television or radio frequency transmitters, Internet service providers, cell phone wireless carriers, satellite phone service providers and/or security monitoring service providers, to individuals and/or facilities through signal receivers such as smartphones, landline telephones, tablets, PC's, voice-controlled web communication devices or the like and/or to signal receivers incorporated in or in direct communication with utilities control units which operate utilities control mechanisms. The utilities control units and/or utilities control mechanisms may also be directly activated by manual control or by dedicated physically responsive sensors. The electromagnetic seismic event effects are detected by the satellites a short time prior to detection of the physical seismic event signals by the ground-based systems, such the high atmospheric effects may be deemed to be in a sense predictive of impending surface tremors, shock waves or the like that may result in damage to the infrastructure and endangerment of life. The mass distribution of alert and/or control signals is preferably limited to the likely zone of danger, and may be based for example on zip codes or addresses, GPS-defined zones, cell tower groupings, or the like. Various embodiments for utilities control units and utilities control mechanisms, such as flow control valves, are contemplated. In a preferred embodiment, the utilities control units or the utilities control mechanisms are provided with sensing systems to detect post-seismic problems or dangerous conditions, such as gas leaks for example, the sensing systems adapted to preclude reactivation of the utilities control mechanisms until the post-seismic problems have been properly addressed.

Alternatively expressed, the invention in various embodiments is a seismic event responsive alert and utilities control system comprising: a ground-based physical seismic event monitoring system adapted to detect physical seismic effects produced by a seismic event; a satellite-based atmospheric seismic event monitoring system adapted to detect atmospheric seismic effects produced by a seismic event; a data analysis processor system adapted to interpret information received from either or both of said ground-based physical seismic event monitoring system and said satellite-based atmospheric seismic event monitoring system, determine the likelihood of potential surface damage resulting from said seismic event, determine the likely region to be adversely affected by the seismic event, and initiate an immediate alert protocol whereby alert and utilities control signals are distributed to one or more broadcasting systems; one or more broadcasting systems adapted to deliver said alert and utilities control signals to signal receivers; signal receivers to receive said alert and utilities control signals, said signal receivers comprising utilities control units adapted to control utilities control mechanisms; and utilities control mechanisms adapted to stop the flow of utilities; whereby upon detection of a seismic effect created by a seismic event by at least one of said ground-based physical seismic event monitoring system and said satellite-based atmospheric seismic event monitoring system, alert and utilities control signals are initiated and delivered through said one or more broadcasting systems to said signal receivers such that the flow of utilities is stopped by said utilities control mechanisms. The embodiments further wherein said physical seismic effects comprise geological, surface and near-surface effects produced by the seismic event; wherein said atmospheric seismic effects comprise high atmospheric LAI effects which are not detectable by said ground-based physical seismic event monitoring system; wherein said LAI effects comprise electromagnetic radiation disrupting or altering electromagnetic fields, ionosphere plasma and high-energy particles; wherein said one or more broadcasting systems comprise one or more of the group of broadcasting systems consisting of Internet service providers, cell phone wireless carriers, satellite phone service providers, commercial or residential monitoring service providers, radio frequency transmitters or stations, and public service warning systems; wherein said signals receivers further comprise one or more of the group of signal receivers consisting of smartphones, tablets, PC's, landline telephones, satellite telephones and voice-controlled web communication devices; wherein said utilities control mechanisms stop the flow of one or more utilities chosen from the group of utilities consisting of gas, water, electricity and oil; wherein said utilities control mechanisms or said utilities control units comprise detection systems and transmission systems, said detection systems being adapted to detect dangerous conditions after said seismic event has concluded, and said transmission systems being adapted to transmit a warning signal upon the detection of a dangerous condition; and/or wherein said transmission systems transmit said warning signal to one or more of the entities chosen from the group of entities consisting of utility companies, security monitoring service providers, and facilities control.

Alternatively, a seismic event responsive alert and utilities control system comprising: a ground-based physical seismic event monitoring system adapted to detect physical seismic effects produced by a seismic event, wherein said physical seismic effects comprise geological, surface and near-surface effects produced by the seismic event; a satellite-based atmospheric seismic event monitoring system adapted to detect atmospheric seismic effects produced by a seismic event, wherein said atmospheric seismic effects comprise high atmospheric LAI effects which are not detectable by said ground-based physical seismic event monitoring system; a data analysis processor system adapted to interpret information received from either or both of said ground-based physical seismic event monitoring system and said satellite-based atmospheric seismic event monitoring system, determine the likelihood of potential surface damage resulting from said seismic event, determine the likely region to be adversely affected by the seismic event, and initiate an immediate alert protocol whereby alert and utilities control signals are distributed to one or more broadcasting systems; one or more broadcasting systems adapted to deliver said alert and utilities control signals to signal receivers, wherein said one or more broadcasting systems comprise one or more of the group of broadcasting systems consisting of Internet service providers, cell phone wireless carriers, satellite phone service providers, commercial or residential monitoring service providers, radio frequency transmitters or stations, and public service warning systems;

signal receivers to receive said alert and utilities control signals, said signal receivers comprising utilities control units adapted to control utilities control mechanisms, wherein said signals receivers further comprise one or more of the group of signal receivers consisting of smartphones, tablets, PC's, landline telephones, satellite telephones and voice-controlled web communication devices; and utilities control mechanisms adapted to stop the flow of utilities, wherein said utilities control mechanisms stop the flow of one or more utilities chosen from the group of utilities consisting of gas, water, electricity and oil; whereby upon detection of a seismic effect created by a seismic event by at least one of said ground-based physical seismic event monitoring system and said satellite-based atmospheric seismic event monitoring system, alert and utilities control signals are initiated and delivered through said one or more broadcasting systems to said signal receivers such that the flow of utilities is stopped by said utilities control mechanisms. Still further, wherein said utilities control mechanisms or said utilities control units comprise detection systems and transmission systems, said detection systems being adapted to detect dangerous conditions after said seismic event has concluded, and said transmission systems being adapted to transmit a warning signal upon the detection of a dangerous condition; and/or wherein said transmission systems transmit said warning signal to one or more of the entities chosen from the group of entities consisting of utility companies, security monitoring service providers, and facilities control.

DETAILED DESCRIPTION OF THE INVENTION

In general, the invention is a seismic event responsive alert and utilities control system and method, which in a preferred embodiment comprises one or more ground-based physical seismic event monitoring systems and one or more satellite-based atmospheric seismic event monitoring systems. As used herein, the ter "seismic event" shall refer to a geological event resulting from the shifting of plates under the surface or underground volcanic forces, commonly referred to as earthquakes, that typically result in damaging surface effects to infrastructure and danger to life. The term "physical seismic effect" shall refer to geological, surface and near-surface effects produced by the seismic event which occur at or near the surface, such as tremors or shock waves, as well as low-atmosphere effects. The term "atmospheric seismic effect" shall refer to high atmospheric LAI effects produced by the seismic events, such as for example electromagnetic radiation disrupting or altering electromagnetic fields, ionosphere plasma and high-energy particles, which are detectable in the upper atmosphere by satellites. The term "ground-based physical seismic event monitoring system" shall refer to systems, facilities or devices located on or at the earth's surface that detect physical seismic effects. The term "satellite-based atmospheric seismic event monitoring system" shall refer to orbiting satellite systems or devices that detect high altitude atmospheric seismic effects, and in particular detect high altitude atmospheric seismic effects not detectable by ground-based physical seismic event monitoring systems, which may be due in part to telecommunication jamming frequencies or atmospheric pollution.

Figure 1:
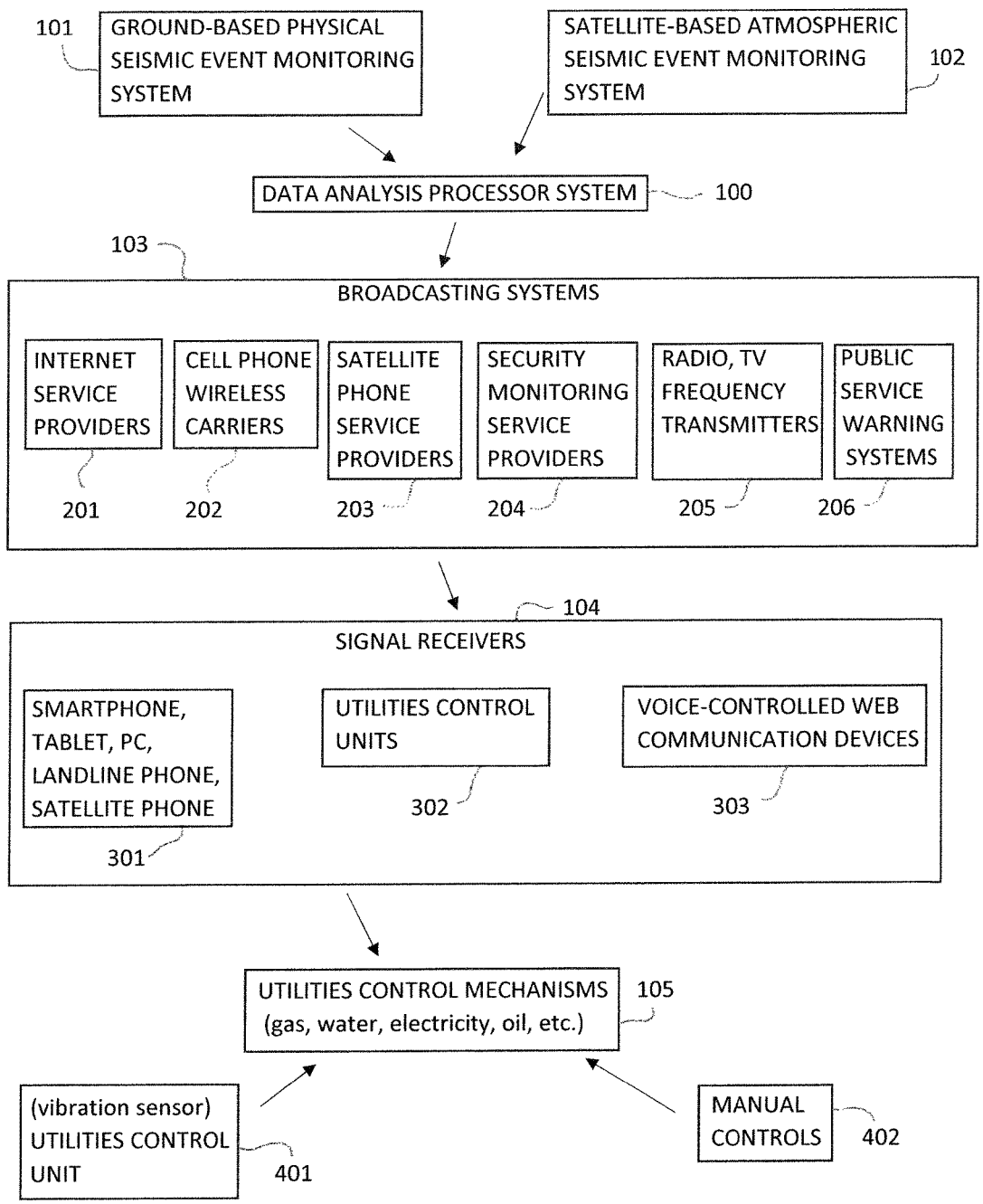
FIG. 1 is an overview illustration of the various elements of the system showing the various pathways for the delivery of alert and control signals to individuals, signal receiving devices and utilities control units.
Figure 2:
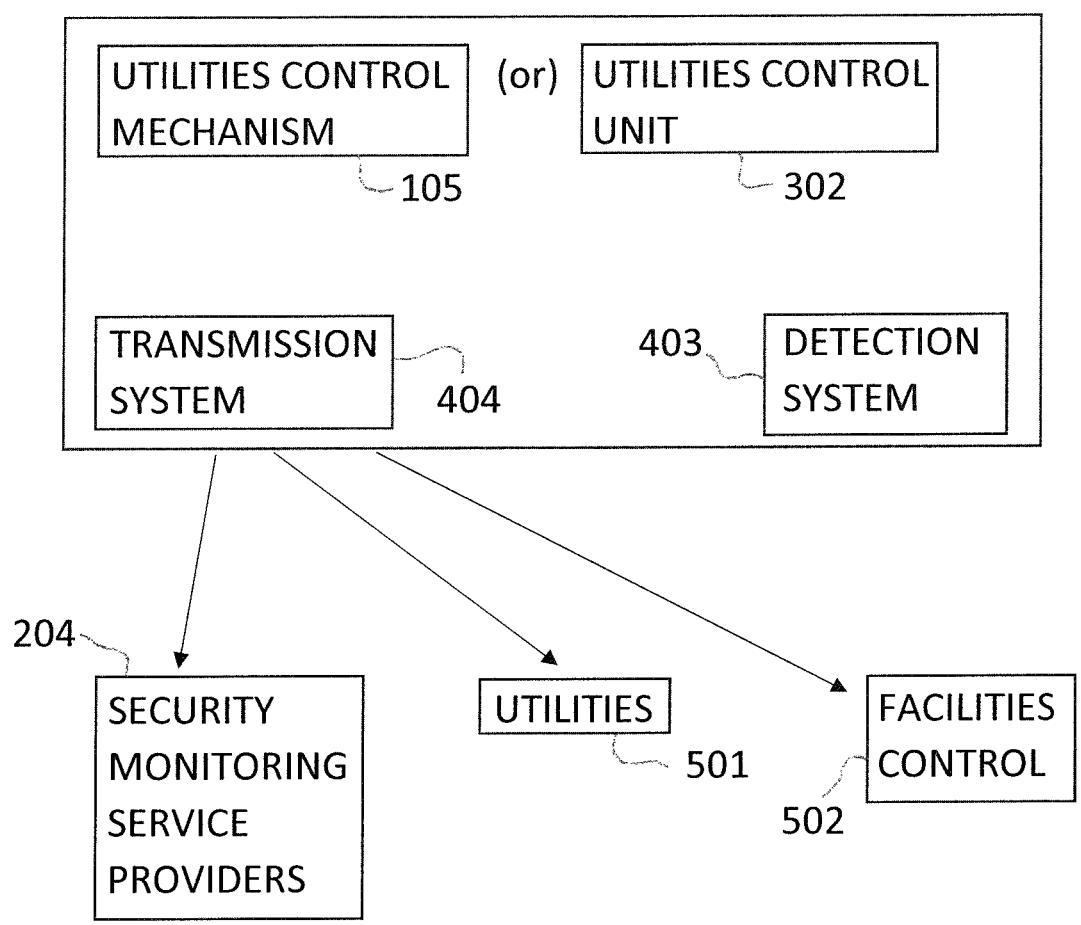
FIG. 2 is an illustration of an embodiment of a utilities control mechanism or utilities control unit having a detection system to detect leaks or other dangerous conditions present after the seismic event has occurred, and further having a transmission system to communicate the condition to various entities.

FIG. 1 illustrates a preferred embodiment of the seismic event responsive alert and utilities control system wherein complementary ground-based physical seismic event monitoring systems 101 and satellite-based atmospheric seismic event monitoring systems 102 are utilized to detect seismic events. Upon detection of the seismic event by either the ground-based physical seismic event monitoring systems 101 or satellite-based atmospheric seismic event monitoring systems 102, a data analysis processor system 100 incorporating computer processing systems operated by appropriate software interprets information received from either or both the ground-based physical seismic event monitoring systems 101 and satellite-based atmospheric seismic event monitoring systems 102, determines there is a high likelihood of potential surface damage resulting from the seismic event, determines the likely region to be adversely affected by the seismic event and initiates an immediate alert protocol, based on pre-established channels of communication, whereby alert and utilities control signals are sent out over a broadcasting system 103 capable of reaching a large number of signal receivers 104, and which preferably includes multiple signal carrier systems, such as for example Internet service providers 201, cell phone wireless carriers 202, satellite phone service providers 203 business or residential security monitoring service providers 204, radio or television frequency transmitters 205 and/or public service warning systems 206, such as the USGS WEA system. The ground-based physical seismic event monitoring systems 101 and satellite-based atmospheric seismic event monitoring systems 102 may comprise dedicated or separate ground-based data analysis processor systems 100, the ground-based physical seismic event monitoring systems 101 and satellite-based atmospheric seismic event monitoring systems 102 may each comprise internal data analysis processor systems 100, or one of the broadcasting systems 103, such as for example the USGS WEA system, may comprise a data analysis processor system 100 which receives the seismic data and distributes the alert and utilities control signals to other broadcasting systems 104 in addition to transmitting the alert and utilities control signals to its signal receivers 104.

The alert and utilities control signals are immediately and simultaneously distributed to multiple signal receivers 104 within the area determined to be likely to be affected by the seismic event. For example, wide-spread or blast alert signals may be sent by Verizon to all individuals having a Verizon cell phone account whose mobile phone is determined to be within the region of expected danger, e.g., five miles from the expected epicenter of the seismic event, as well as sending utilities control signals to signal receivers 104 associated with utilities control units 302. Likewise, Comcast may send alert and control signals to all Comcast computer accounts or Internet-connected utilities control units 302 within the region. The alert and control signals may also be sent directly to pre-determined localized institutional recipients, such as governmental entities, schools, hospitals, universities, large industrial sites, chemical manufacturing plants, etc. Signal receivers 104 may include for example landline telephones, personal smartphones, satellite phones, tablets or PC's 301, utilities control units 302 that control the flow of utilities such as gas, water or electricity, and/or voice-controlled web communication devices 303, such as for example smart speakers sold under the brand names ECHO DOT or GOOGLE HOME. The signals may be distributed over radio, television, wifi, the Internet, or any other suitable broadcasting medium, in the form of voice recordings, text messages, instant messages, app alerts, etc. The utilities control units 302 may have multiple receiver systems, i.e. cell or radio antennas, wifi receivers, hardwire phone lines, etc., such that a primary or dedicated signal type may be chosen (e.g., cell signal) or such that the utilities control units may have redundant active receiver systems (e.g., cell signal, radio signal and wifi), any of which are active to receive the utilities control signal.

Ground-based physical seismic events monitoring systems 101 are known and at a minimum detect the basic physical seismic effects, such as tremors or shock waves, using traditional physical seismic effect sensors, such as for example sensors triggered by excessive vibrations. The physical seismic effect sensors may be electronically sophisticated devices, such as for example an OMRON integrated circuit chip, or may be as simple as pedestal-type sensors where a physical object falls or unseats due to the seismic vibrations. These systems may also comprise the ability to detect other ground or low atmosphere physical seismic effects, such as charged aerosols, radioactivity, gas composition, DC electric fields and conductivity, and VHF broadcast radiation, as well as probing the ionosphere by ULF/ELF/VLF/LF waves. For example, the United States Geological Service (USGS) 206 operates a ground-based physical seismic events monitoring system 101 which broadcasts Wireless Emergency Alerts (WEA) in text form to wireless phones and other enabled mobile devices within a geographically determined area alerting the users of an imminent seismic threat. For example, once a danger area is determined, alert signals may be transmitted only through a restricted number of cell towers located within or near the danger area. Other public safety alerts such as weather, terrorist, chemical spill or like emergencies may be distributed by other governmental authorities over this WEA system.

Satellite-based atmospheric seismic event monitoring systems 102 are relatively new. Such systems utilize earth orbiting satellites to sense high altitude atmospheric seismic effects caused by natural geophysical activity, effects which are not detectable by ground-based seismic event monitoring systems 101. The sensors detect electromagnetic emissions over a large frequency range, ULF/ELF/VHF emissions, perturbations of ionospheric layers, anomalies in VLF transmitter signals, DC electric fields, and/or even nightglow observations. The atmospheric seismic effects can often be detected up to 30 seconds, and sometimes as much as several hours, prior to the occurrence of the physical seismic effects and can therefore be used as predictive or early warning indicators of possible near-future seismic events. Not all seismic events produce atmospheric seismic effects, so maximum protection is provided by combining the satellite-based atmospheric seismic event monitoring systems 102 with the ground-based physical seismic events monitoring systems 101.

The efficacy of the system resides in the ability of the broadcasting system 103 to immediately provide alert and control signals to the particular geographical region expected to be affected by the seismic event, with the signals being broadcast most preferably over multiple and varied signal providers, carriers, etc., so as to reach as many people, agencies, institutions and the like as possible. Thus for example, the broadcasting system 103 preferably comprises a combination of all or some of Internet service providers 201, cell phone wireless carriers 202, satellite phone service providers 203, commercial or residential monitoring service providers 204, radio frequency transmitters or stations 205, and public service warning systems 206, which in turn deliver the alert and control signals to various signal receivers 104. Examples of providers in the broadcasting system 103 include Verizon, AT&T, Comcast, Google, Microsoft, ADT Security Services, USGS WEA, etc. The signal receivers 104 may include landline telephones, smartphones, satellite phones, tablets or PC's 301, utilities control units 302, and/or voice-controlled web communication devices 303, or any similar devices adapted to receive messages or activation signals via radio frequency, landline, cell tower, wifi, Bluetooth, etc.

An important component of the seismic event responsive alert and utilities control system is the ability to immediately stop the flow of utilities, such as gas, water, oil and electricity, in order to minimize secondary damage, such as fire, explosions, flooding, etc., resulting from a major seismic event. Thus, the signal receivers 104 of the seismic alert and utilities control system comprise utilities control units 302 that are adapted to actuate one or more dedicated utilities control mechanisms 105. The dedicated utilities control mechanisms 105 include gas valves, oil valves, water valves, electrical switches or the like which shut off the flow utilities. Upon receipt of a control signal from the broadcasting system 103 indicating that a seismic event is imminent or occurring, the utilities control unit 302 activates the utilities control mechanisms 105 to stop delivery of the gas, water, oil and electricity through the utility system. A single utilities control unit 302 may operate a single utilities control mechanism 105, but preferably a single utilities control unit 302 will control multiple utilities control mechanisms 105. In this sense the utilities control unit 302 is a communications hub connected to a plurality of nodes. The actuation communication may occur through direct hard-wired circuitry, or may be accomplished via radio transmission, wifi, Bluetooth or similar means.

The utilities control units 302 or utilities control mechanisms 105 may be provided with or used in conjunction with redundant actuation mechanisms or systems. For example, the utilities control units 302 may be provided with both a system to receive the control signals from the broadcasting system 103 and a physical vibration sensor utilities control unit 401 adapted to actuate closure of the utilities control mechanisms 105. Furthermore, the utilities control units 302 or the utilities control mechanisms 105 could be activated by manual controls 402, and alternatively still, could be activated by user input commands from a signal receiver smartphone, tablet or PC 301. Because the time from signal broadcast to the occurrence of physical seismic events may be brief, automatic systems that require no user input or action are most preferred.

Because smartphones 301 are ubiquitous in today's world, a preferred embodiment of the seismic event responsive alert and utilities control system comprises a broadcasting system 103 that includes a cell phone wireless carrier 202, as in most circumstances this is the optimal manner with which to distribute the alert and utilities control signals to the largest number of people and devices within the affected geographical region.

In an even more preferred system, the broadcasting system 103 includes both a cell phone wireless carrier 202 and to security monitoring service provider 204, such as for example ADT Security Services. Inclusion of the security monitoring service providers 204 is extremely beneficial in the implementation and establishment of the system, as the security monitoring service providers 204 provide an existing broadcasting system 103 with large numbers of signal receivers 104. The complete seismic event responsive alert and utilities control system can therefore be immediately implemented in earthquake prone areas having established security monitoring service providers 204. The security monitoring service providers 204 each provide a single source for immediate distribution of the alert signals. Furthermore, many security monitoring service providers 204 also incorporate device control systems capable of operating cameras, locks, fire suppression equipment, etc. The incorporation of utilities control units 302 and utilities control mechanisms 105 within their existing systems is therefore easily accomplished.

It is not uncommon, particularly in commercial facilities or residences set up to be "smart-homes", that electronically controlled non-communication devices will be present, such as for example cameras, fire alarms, automatic door locks, automatic garage doors, elevators, escalators, etc. Such devices may be provided with the equivalent of utilities control units 302, which may be referred to as facilities control units, such that the device may be deactivated (or activated) by the equivalent of a utilities control signal, a facilities control signal, provided by one of the broadcasting systems 103. In particular, a facility monitored by a security monitoring service provider 204 could transmit specific facilities control signals to deactivate elevators, lock or unlock doors, etc.

In still another embodiment, the utilities control unit 302 or utilities control mechanism 105 are adapted such that the valves, circuits, etc., may be opened remotely once the seismic event has passed to reinitiate the flow of utilities. Preferably a password or authentication code issued by the utilities provider is required prior to remote, or even localized, reactivation to ensure that reopening the valves, circuits, etc. is performed only after the situation is deemed safe. With such a system, it is preferred that the seismic event responsive alert and utilities control system further comprises utilities control units 302 or utilities control mechanisms 105 having detection or sensing systems, devices or mechanisms 403 adapted to determine after the danger of the seismic event has passed whether it is safe to resume delivering utilities. For example, a utilities control unit 302 or utilities control mechanism 105 that is a gas flow valve may be provided with a gas detection or sniffing system 403 that can detect a gas leak when the gas flow is resumed. Similar detection systems 403 may be provided for water, oil and electric lines to indicate and alert when there are dangerous conditions present. In a basic embodiment the utilities control units 302 or utilities control mechanisms 105 may provide a visible indicator signal and/or preclude reopening of the utilities valve, circuit or shut off mechanism until examined by a technician.

In a more preferred embodiment, the utilities control units 302 or utilities control mechanisms 105 are also provided with transmission systems 404 with appropriate processor or integrated circuit systems adapted to communicate a warning signal indicating the existence of a dangerous condition (or lack of) to the appropriate entities for action (utility companies 501, security monitoring service providers 204, facilities operators or control systems 502 at hospitals, schools, chemical manufacturing plants, etc.), such as halting the flow of the utilities, sending repair crews, evacuating buildings, etc. The transmission systems 404 may deliver the information in any known manner (hardwire, landline, wifi, Bluetooth, radio, etc.). The sensing systems 403 may also serve the additional purpose of continuously monitoring the utilities, such that a dangerous condition occurring in the future, for example a gas leak, can be reported and addressed.

For utilities distribution facilities, such as gas supply depots, electrical production facilities, water supply facilities, the utilities control units 302 or utilities control mechanisms 105 will be installed on the large-volume delivery pipelines, grids or conduits at the facilities so that mass distribution of gas, electricity or water may be stopped at the source. Likewise, the utilities control units 302 or utilities control mechanisms 105 will be installed on site for utilities recipients or end-users (houses, commercial establishments, hospitals, apartments, factories, schools, etc.). In this manner individual houses, building, facilities and the like having localized damage to the utilities are independently protected once mass distribution of utilities resumes.

There are currently millions of standard utilities control mechanisms in use wherein the status condition of the valve (i.e., open or closed) is controlled manually or by an electrical signal received from a standard control unit that is manually actuated, e.g., turning a switch. Therefore, one scenario for implementation of the system is through retrofitting the existing utilities control mechanisms and control units to convert them into utilities control units 302 or utilities control mechanisms 105 as described herein and which are then suitable for incorporation into the seismic event responsive alert and utilities control system. This is accomplished by providing a communications module that is interconnected to the standard control unit of the standard utilities control mechanism, or directly to the standard utilities control mechanism. The communications module is adapted to receive the utilities control signals from the broadcasting system 103 and send an operational signal to the standard control unit, thereby triggering closure of the utilities control mechanism. The communications module is hardwired to the standard utilities control unit such that closure is triggered by receipt of a utilities control signal in the same manner as if the device was manually activated. The standard utilities control unit or the standard utilities control mechanism now operating as a utilities control unit 302 or utilities control mechanism 105 may also be provided with a detection system 403 and a transmission system 404, constructed as part of the communications module, to provide the expanded capabilities of detecting and reporting dangerous conditions post-seismic event.

The seismic event responsive alert and utilities control system can be utilized to control large-scale utility or pipeline systems, such that rather than or in addition to controlling a large number of building specific utilities control mechanisms 105 receiving gas, water, electricity or oil from the large-scale utility or pipeline systems, entire electrical grids or miles of gas, water or oil pipelines can be shut down upon the occurrence of a seismic event.

In addition to controlling the flow of utilities upon the occurrence of a seismic event, the system may further be used with control mechanisms not connected to utilities. For example, any control mechanism that operates a mechanical system, such as an elevator, escalator, drawbridges, etc., could be incorporated into the seismic event responsive alert and utilities control system such that mechanical systems would be rendered inoperable, i.e., locked down, during the seismic event.

For signal receivers 104 that comprise smartphones, tablets, PC's or the like, a further embodiment would provide dedicated software apps or websites that include the ability for the user or installers to designate or pair with individual or multiple utilities control units 302, utilities control mechanisms 105, broadcasting systems 103, etc., thereby allowing for the customization of a seismic event responsive alert and utilities control system. The apps or websites can provide condition indicators, status checks, alternative warning systems sources, operational controls or the like. The apps or websites can provide direct communication means with security monitoring service providers 204.

In step-wise fashion, the method at hand comprises as a first step the provision of the described monitors, systems, receivers and control mechanisms in an interconnected seismic event responsive alert and utilities control system, to wit, one or more ground-based physical seismic event monitors 101; one or more satellite-based atmospheric seismic event monitors 102; a broadcasting system 103 comprising one or more of Internet service providers 201, cell phone wireless carriers 202, satellite phone service providers 203, commercial or residential monitoring service providers 204, radio frequency transmitters or stations 205, and public service warning systems 206; signal receivers 104 comprising one or more landline telephones, smartphones, satellite phones, tablets or PC's 301, utilities control units 302, and voice-controlled web communication devices 303; and utilities control mechanisms 105.

In additional steps, the ground-based physical seismic event monitors 101 and satellite-based atmospheric seismic event monitors 102 monitor for seismic effects, and when such seismic effects are detected, initiate an alert protocol to distribute alert and utilities control signals through one or more of the broadcasting systems 103 over one or more communications mediums to one or more of the signal receivers 104, preferably by a plurality of broadcast systems 103 to a plural number of signal receivers 104, some of the signal receivers 104 being a plurality of utilities control units which upon receipt of the utilities control signals actuate a plurality of utilities control mechanisms 105 to stop the flow of utilities through a utilities delivery system.

An embodiment of the method may also comprise the step of providing detection systems 403 and transmission systems 404 in communication with or as components of the utilities control units 302 or utilities control mechanisms 105, whereby the detection systems 403 monitor for dangerous post-seismic event conditions and upon detection of such, the transmission systems 404 transmit such information to various entities, such as utility companies 501, security monitoring service providers 204, facilities operators or control 502 at hospitals, schools, chemical manufacturing plants, etc. The method may further comprise providing an authorization code or similar authorization prior to reopening of the utilities control mechanisms 105 to resume utilities flow.

It is understood and contemplated that equivalents and substitutions of elements, devices, systems and method steps set forth above may be obvious to those skilled in the art, and therefore the true scope and definition of the invention is to be as set forth in the following claims.

I claim:

1. A method of controlling the flow of one or more utilities responsive to seismic events, said one or more utilities chosen from the group of utilities consisting of gas, water, electricity and oil, the method comprising the steps of:
   detecting physical seismic effects produced by a seismic event by a ground-based physical seismic event monitoring system;
   detecting atmospheric seismic effects produced by a seismic event by a satellite-based atmospheric seismic event monitoring system, wherein said atmospheric seismic effects comprise high atmospheric LAI effects which are not detectable by said ground-based physical seismic event monitoring system;
   interpreting information received from either or both of said ground-based physical seismic event monitoring system and said satellite-based atmospheric seismic event monitoring system, determining the likelihood of potential surface damage resulting from said seismic event, determining the region to be adversely affected by the seismic event, and initiating an immediate alert protocol whereby alert and utilities control signals are distributed to one or more broadcasting systems;
   broadcasting said alert and utilities control signals to signal receivers within the region previously determined to be adversely affected by the seismic event, said signal receivers comprising utilities control units adapted to control utilities control mechanisms adapted to stop the flow of said one or more utilities; and
   actuating said utilities control mechanisms to stop the flow of said one or more utilities.

2. The method of claim 1, wherein said physical seismic effects comprise one or more of the group of physical seismic effects consisting of geological, surface and near-surface effects produced by the seismic event.

3. The method of claim 2, wherein said LAI effects comprise one or more of the group of LAI effects consisting of electromagnetic radiation disrupting or altering electromagnetic fields, ionosphere plasma and high-energy particles.

4. The method of claim 2, wherein said signals receivers further comprise one or more of the group of signal receivers consisting of smartphones, tablets, PC's, landline telephones, satellite telephones and voice-controlled web communication devices.

5. The method of claim 2, further comprising the steps of detecting dangerous conditions in said utilities control mechanisms after said seismic event has concluded, and transmitting a warning signal upon the detection of a dangerous condition.

6. The method of claim 1, wherein said LAI effects comprise one or more of the group of LAI effects consisting of electromagnetic radiation disrupting or altering electromagnetic fields, ionosphere plasma and high-energy particles.

7. The method of claim 1, wherein said one or more broadcasting systems comprise one or more of the group of broadcasting systems consisting of Internet service providers, cell phone wireless carriers, satellite phone service providers, commercial or residential monitoring service providers, radio frequency transmitters or stations, and public service warning systems.

8. The system of claim 7, further comprising the steps of detecting dangerous conditions in said utilities control mechanisms after said seismic event has concluded, and transmitting a warning signal upon the detection of a dangerous condition.

9. The method of claim 1, wherein said signals receivers further comprise one or more of the group of signal receivers consisting of smartphones, tablets, PC's, landline telephones, satellite telephones and voice-controlled web communication devices.

10. The system of claim 9, further comprising the steps of detecting dangerous conditions in said utilities control mechanisms after said seismic event has concluded, and transmitting a warning signal upon the detection of a dangerous condition.

11. The further of claim 1, further comprising the steps of detecting dangerous conditions in said utilities control mechanisms after said seismic event has concluded, and transmitting a warning signal upon the detection of a dangerous condition.

12. The method of claim 11, further comprising the steps of transmitting a signal to said utilities control unit to re-open the flow of said one or more utilities.

13. The method of claim 11, wherein said warning signal is transmitted to one or more of the entities chosen from the group of entities consisting of utility companies, security monitoring service providers, and facilities control.

14. The method of claim 1, further comprising the steps of transmitting a signal to said utilities control unit to re-open the flow of said one or more utilities.

15. A method of controlling the flow of one or more utilities responsive to seismic events, said one or more utilities chosen from the group of utilities consisting of gas, water, electricity and oil, the method comprising the steps of:
  detecting physical seismic effects by a ground-based physical seismic event monitoring system adapted to detect physical seismic effects produced by a seismic event, wherein said physical seismic effects comprise one or more of the group of physical seismic effects consisting of geological, surface and near-surface effects produced by the seismic event;
  detecting atmospheric seismic effects by a satellite-based atmospheric seismic event monitoring system adapted to detect atmospheric seismic effects produced by a seismic event, wherein said atmospheric seismic effects comprise high atmospheric LAI effects which are not detectable by said ground-based physical seismic event monitoring system;
  processing information received from either or both of said ground-based physical seismic event monitoring system and said satellite-based atmospheric seismic event monitoring system by a data analysis processor system adapted to interpret information received from either or both of said ground-based physical seismic event monitoring system and said satellite-based atmospheric seismic event monitoring system, determining the likelihood of potential surface damage resulting from said seismic event, determining the region to be adversely affected by the seismic event, and initiating an immediate alert protocol whereby alert and utilities control signals are distributed to one or more broadcasting systems;
  delivering said alert and utilities control signals by one or more broadcasting systems adapted to deliver said alert and utilities control signals to signal receivers, wherein said one or more broadcasting systems comprise one or more of the group of broadcasting systems consisting of Internet service providers, cell phone wireless carriers, satellite phone service providers, commercial or residential monitoring service providers, radio frequency transmitters or stations, and public service warning systems;
  receiving said alert and utilities control signals by signal receivers adapted to receive said alert and utilities control signals, said signal receivers comprising utilities control units adapted to control utilities control mechanisms adapted to stop the flow of said one or more utilities, wherein said utilities control mechanisms stop the flow of said one or more utilities, wherein said signals receivers further comprise one or more of the group of signal receivers consisting of smartphones, tablets, PC's, landline telephones, satellite telephones and voice-controlled web communication devices; and
  actuating said utilities control mechanisms to stop the flow of said one or more utilities.

16. The method of claim 15, further comprising the steps of detecting dangerous conditions in said utilities control mechanisms or said utilities control units after said seismic event has concluded by detection systems associated with said utilities control mechanisms or said utilities control units, and transmitting by transmission systems incorporated in said utilities control mechanisms or said utilities control units a warning signal upon the detection of a dangerous condition, wherein said transmission systems transmit said warning signal to one or more of the entities chosen from the group of entities consisting of utility companies, security monitoring service providers, and facilities control.

17. The method of claim 15, further comprising the steps of transmitting a signal to said utilities control unit to re-open the flow of said one or more utilities.

* * * * *